(12) United States Patent
Ronchetto et al.

(10) Patent No.: US 12,071,017 B2
(45) Date of Patent: Aug. 27, 2024

(54) TRANSMISSION MODULE PROVIDED WITH A HYDRAULIC ACTUATOR

(71) Applicant: DAYCO EUROPE S.R.L., Chieti (IT)

(72) Inventors: Roberto Ronchetto, Cuorgne' (IT); Alessio Courtial, Turin (IT); Gregorio Luciani, Chieti (IT)

(73) Assignee: DAYCO EUROPE S.R.L., Chieti (IT)

( * ) Notice: Subject to any disclaimer, the term of this patent is extended or adjusted under 35 U.S.C. 154(b) by 157 days.

(21) Appl. No.: 17/757,844

(22) PCT Filed: Dec. 24, 2020

(86) PCT No.: PCT/IB2020/062441
§ 371 (c)(1),
(2) Date: Jun. 22, 2022

(87) PCT Pub. No.: WO2021/130722
PCT Pub. Date: Jul. 1, 2021

(65) Prior Publication Data
US 2023/0030761 A1 Feb. 2, 2023

(30) Foreign Application Priority Data
Dec. 27, 2019 (IT) .................. 102019000025642

(51) Int. Cl.
*B60K 6/387* (2007.10)
*B60K 6/36* (2007.10)
(Continued)

(52) U.S. Cl.
CPC ............... *B60K 6/387* (2013.01); *B60K 6/36* (2013.01); *F16D 25/12* (2013.01); *F16D 2125/06* (2013.01); *F16D 2300/08* (2013.01)

(58) Field of Classification Search
CPC ..... B60K 6/387; F16D 25/12; F16D 2125/06; F16D 2300/08
See application file for complete search history.

(56) References Cited

U.S. PATENT DOCUMENTS

| | | | |
|---|---|---|---|
| 2006/0054444 A1* | 3/2006 | Bishop | F16D 48/02 192/109 F |
| 2012/0318630 A1* | 12/2012 | Iwase | B60L 50/16 192/85.01 |

(Continued)

FOREIGN PATENT DOCUMENTS

| | | |
|---|---|---|
| DE | 102016212846 A1 | 1/2018 |
| WO | 2019179560 A1 | 9/2019 |

OTHER PUBLICATIONS

PCT/IB2020/062441, International Search Report and Written Opinion, Mar. 16, 2021 (12 pages).

(Continued)

*Primary Examiner* — Jake Cook
(74) *Attorney, Agent, or Firm* — FisherBroyles, LLP; Susan M. Oiler

(57) ABSTRACT

A transmission module for a hybrid drive vehicle configured to be interposed between an internal combustion engine and a transmission of the vehicle has a tray-like support structure configured to be secured to the engine and defines a housing for a clutch to be interposed between a crankshaft of the internal combustion engine and the module. An actuator controls the clutch. The actuator includes an annular chamber provided in the support structure and opens toward the housing, and an annular piston housed in the annular chamber is axially sliding but angularly fixed. A thrust member is coupled in a rotationally free manner to the annular piston, coaxial thereto and operable to cooperate with a control member of the clutch under the thrust of the piston.

11 Claims, 5 Drawing Sheets

(51) Int. Cl.
*F16D 25/12* (2006.01)
*F16D 125/06* (2012.01)

(56) References Cited

U.S. PATENT DOCUMENTS

| | | | |
|---|---|---|---|
| 2014/0262674 A1* | 9/2014 | Saito | F16D 25/083 |
| | | | 192/70.11 |
| 2015/0211583 A1 | 7/2015 | Jugovic et al. | |
| 2017/0355257 A1 | 12/2017 | Lebas et al. | |
| 2018/0149209 A1* | 5/2018 | Cattoor | F16D 13/52 |
| 2018/0163794 A1* | 6/2018 | Deneszczuk | F16D 25/12 |
| 2020/0300309 A1* | 9/2020 | Klück | F16D 25/087 |
| 2020/0309168 A1* | 10/2020 | Heitzenrater | F16J 15/164 |
| 2020/0355227 A1* | 11/2020 | Tysman | F16D 25/0638 |

OTHER PUBLICATIONS

Office Action, European Patent Application No. 20845231.8, Sep. 28, 2023, p. 5.

\* cited by examiner

TRANSMISSION MODULE PROVIDED WITH A HYDRAULIC ACTUATOR

CROSS-REFERENCE TO RELATED APPLICATIONS

The present invention is filed under 35 U.S.C. § 371 as the U.S. National Phase of International Patent Application No. PCT/IB2020/062441, filed Dec. 24, 2020, which designated the United States and which claims the benefit of Italian patent application no. 102019000025642, filed on Dec. 27, 2019, the entire disclosure of which is incorporated herein by reference.

TECHNICAL FIELD

The present invention concerns a transmission module provided with a hydraulic actuator. The invention is preferably applied, albeit not exclusively, in a hybrid transmission module provided with a hydraulic control clutch, which will be referred to below without loss of generality.

BACKGROUND ART

As is known, hybrid drive vehicles comprise an internal combustion engine and at least an electric machine which can be used as a generator or as a motor to deliver torque in combination with (or alternatively to) the internal combustion engine, according to the operating conditions of the vehicle.

A configuration in which an electric machine is used connected between the internal combustion engine and the vehicle transmission is conventionally called "P2". Modular units are known designed to be interposed between the internal combustion engine and the vehicle transmission (and therefore currently called "P2 modules") which comprise, in addition to the electric machine, one or more hydraulic control clutches to selectively connect the internal combustion engine and/or the electric machine to the transmission, in addition to the relative actuators and transmission elements.

In particular, the hydraulic control clutches are normally provided with a spring which exerts an axial load designed to keep the clutch plates together in a pack. The clutches of the above-mentioned type are normally actuated in opening by means of a hydraulic actuator, which is designed to generate an axial load which opposes that of the spring.

The hydraulic actuators for known clutches generally consist of an autonomous unit defining an internal chamber into/from which pressurized oil can be supplied/discharged. When the chamber is pressurized, the actuator expands axially so as to provide an axial load which overcomes the force of the clutch spring.

One problem connected with the known actuators is their large overall dimensions, in particular in axial direction. The use of said actuators in situations with limited installation space, as in the case of the transmission modules cited above, is therefore problematic.

DISCLOSURE OF INVENTION

The object of the present invention is to provide a hydraulic actuator with particularly compact overall dimensions, in particular in the axial direction.

The above-mentioned object is achieved by a transmission module configured to be interposed between an internal combustion engine and a transmission of the vehicle. The module has a tray-like support structure configured to be secured to the engine and defines a housing for a clutch, and a hydraulic actuator for controlling the clutch. The hydraulic actuator has an annular chamber provided in the support structure that open towards the housing for the clutch, an annular piston axially movable in the annular chamber, and a thrust member constrained in a rotationally free manner to the piston, coaxial thereto and configured to cooperate with a control member of the clutch under the thrust of the piston.

The above-mentioned object is achieved by a transmission module according to claim 1.

BRIEF DESCRIPTION OF THE DRAWINGS

For a better understanding of the present invention a preferred embodiment is described, by way of non-limiting example and with reference to the attached drawings, in which.

BEST MODE FOR CARRYING OUT THE INVENTION

Figure 2:
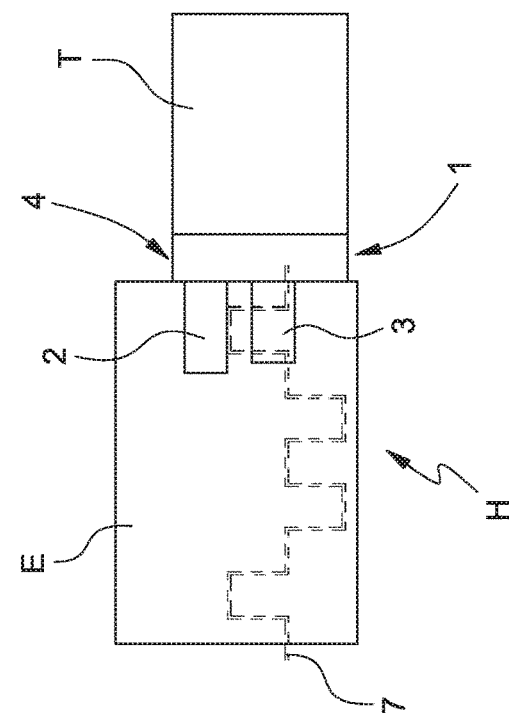
FIG. 2 is a diagram of a hybrid power train of a vehicle comprising the module of the invention.
Figure 1:
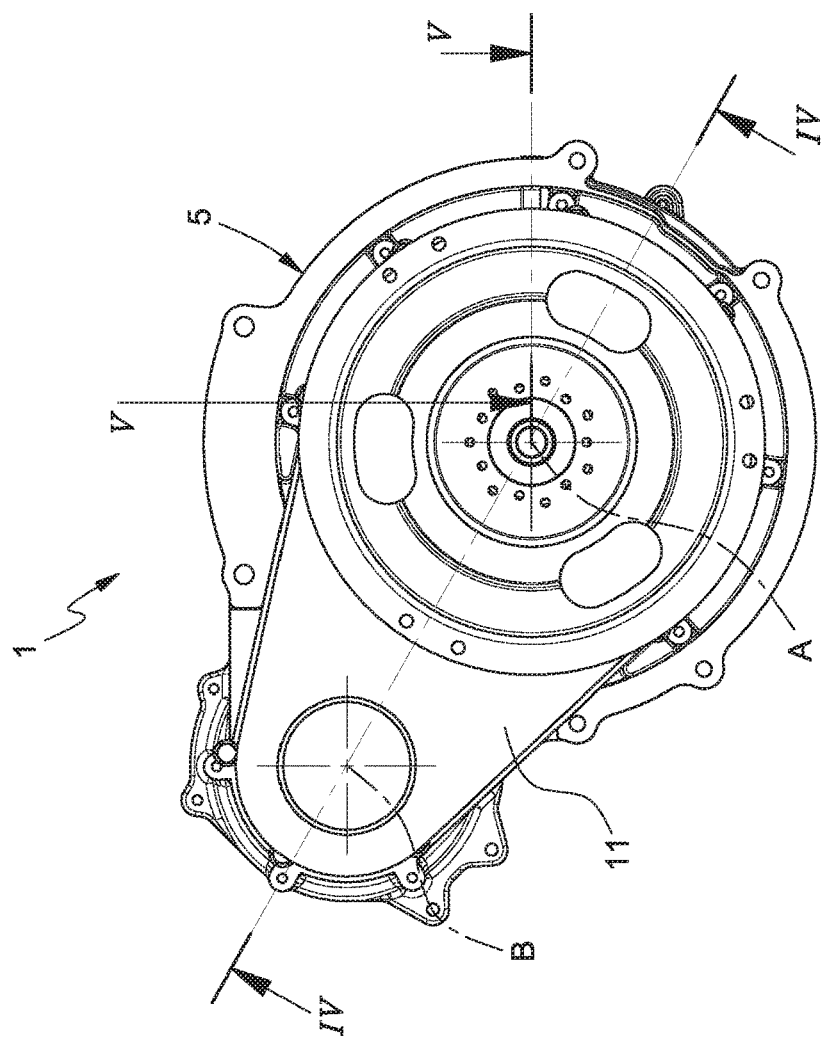
FIG. 1 is a frontal view of a hybrid transmission module produced according to the present invention.
Figure 3:
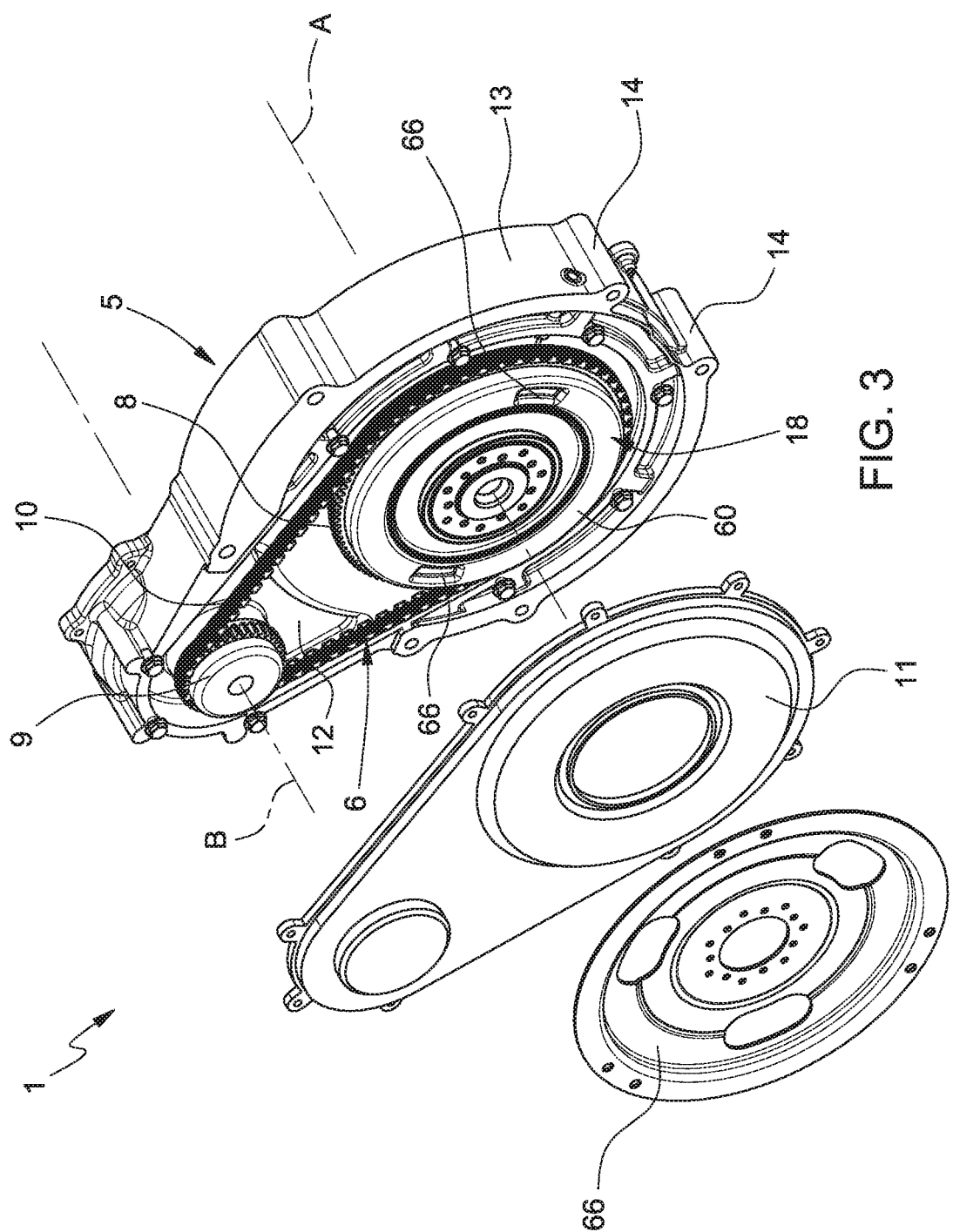
FIG. 3 is an exploded view of the module of FIG. 1.

With reference to FIGS. 1 to 3, the number 1 indicates overall a transmission module P2 designed to be connected between an internal combustion engine E and a transmission T of a hybrid drive vehicle, forming together a hybrid power train H.

The module 1 forms part of a hybrid unit 4 comprising, in addition to the module itself, an electric machine 2. Optionally, the hybrid unit 4 can also comprise one or more accessories such as, for example, a compressor 3 for an air conditioning system of the vehicle (FIG. 2).

The electric machine 2 is expediently of a reversible type, namely it can operate as an electric motor to deliver torque to the transmission (in combination with or alternatively to the internal combustion engine) or as a generator to generate electric power.

Figure 4:
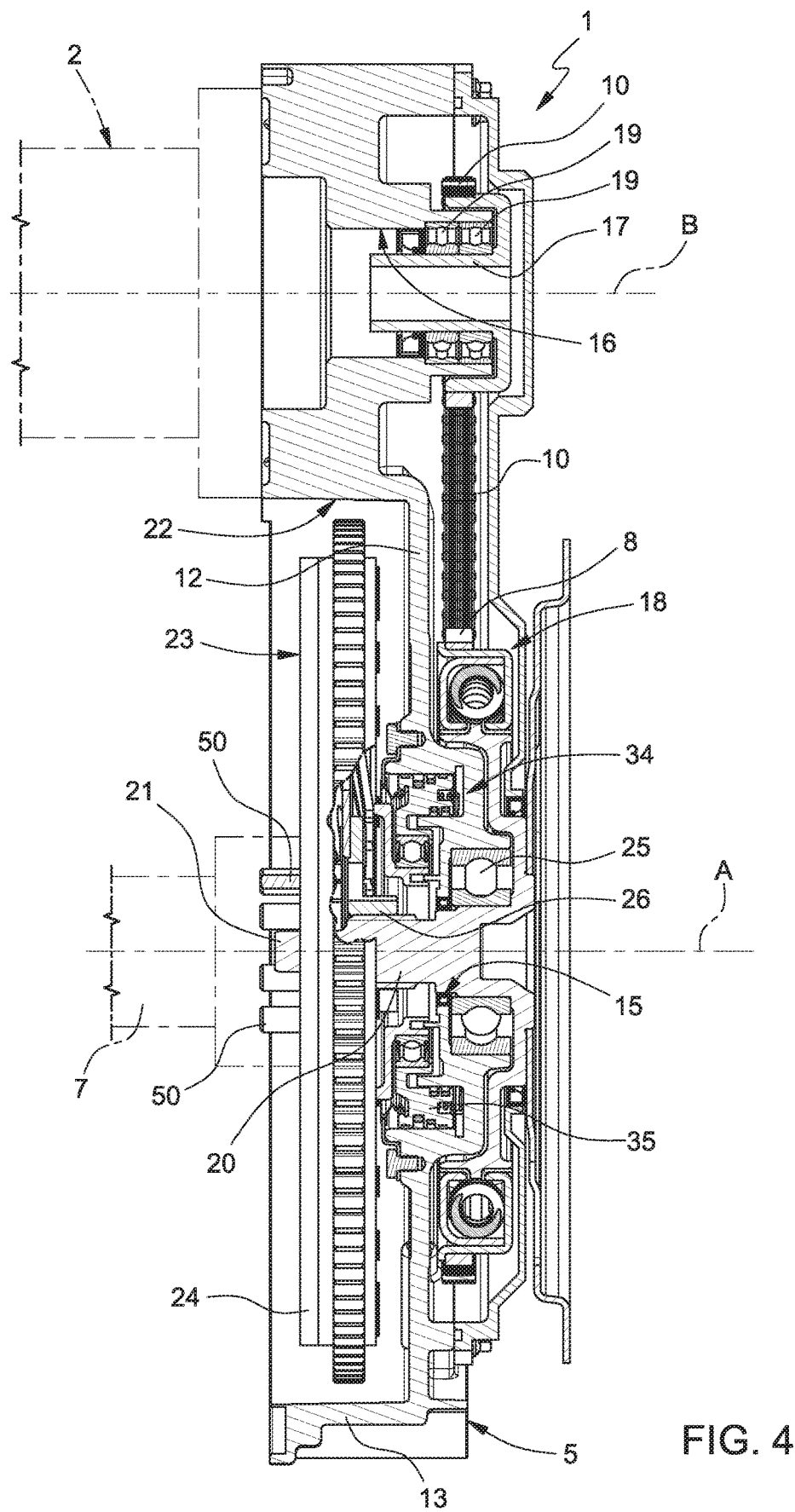
FIG. 4 is a section according to the line IV-IV of FIG. 1.
Figure 5:
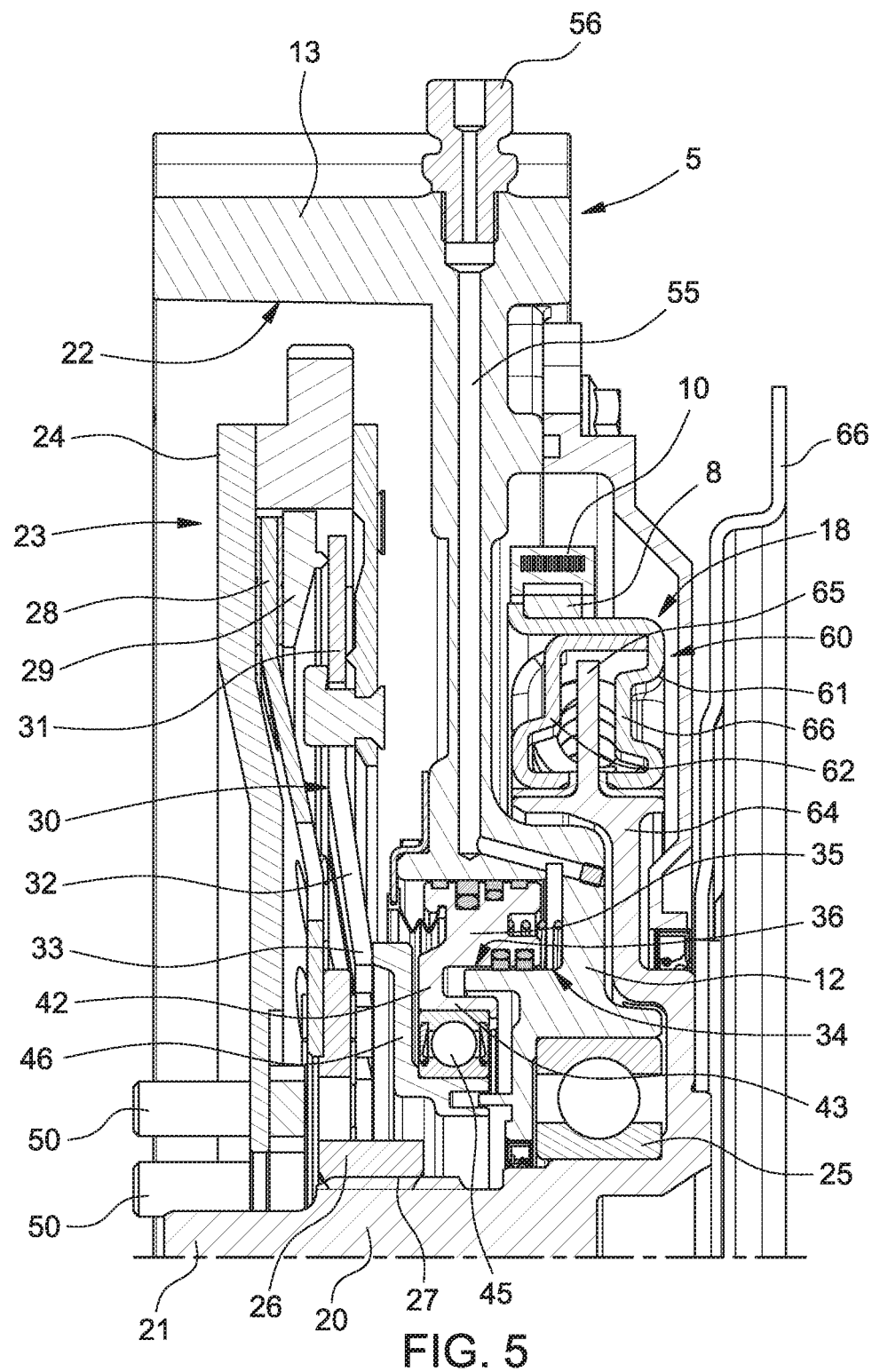
FIG. 5 is a partial section on an enlarged scale according to the line V-V of FIG. 1.

The module 1 (FIGS. 3-5) essentially comprises a tray-like support structure 5 and a transmission 6, in this example a chain transmission, housed in the support structure 5 and configured to operatively and selectively connect to one another a crankshaft 7 of the internal combustion engine E, the electric machine 2 and the transmission T.

In the example illustrated, the transmission 6 comprises a crown wheel 8 with axis A selectively connectable to the crankshaft 7, as described below, and a pinion 9 with axis B designed to be connected to the electric machine 2. The axes A, B coincide in use with the axis of the crankshaft 7 of the engine E and with the axis of the electric machine 2 respectively. The transmission 6 further comprises a chain 10 engaging with the crown 8 and the pinion 9.

The support structure 5 has a substantially flat base wall 12 and a perimeter flange 13 extending perpendicular to it and forming a plurality of projections 14 in which the holes for securing the module 1 to the engine E are obtained. The base wall 12 and the perimeter flange 13 delimit a cavity housing the transmission 6, which is closed frontally by a cover 11.

The base wall 12 forms a pair of through seats 15, 16 (FIG. 4), having axes A and B respectively.

The electric machine 2 (FIG. 4) is assembled at the seat 16, on the opposite side of the transmission 6. The seat 16 houses a hub 17 of the pinion 9 and the relative bearings 19.

The crown 8 forms part of a torsional vibration damper 18, for example of the circumferential spring type, described briefly below since it is known per se and not part of the present invention. The damper 18 is supported by means of a bearing 25 housed in the seat 15 and is provided with a shaft 20 having axis A arranged passing through said seat.

A free end 21 of the shaft 20 is designed to engage an axial centring hole (not illustrated) of the crankshaft 7. The shaft 20 can be selectively connected to the crankshaft 7 by means of a clutch.

The base wall 12 of the support structure 5 is shaped so as to define, on the opposite side of the transmission 6, a housing 22 for the clutch 23. The clutch 23 can be part of the module 1 or, as in the example described, can be an assembly distinct from the module 1 and complementary thereto.

The clutch 23, described here briefly insofar as necessary for understanding the present invention but not forming part thereof, comprises an external casing 24 secured to the crankshaft 7 by means of axial screws 50, and a hub 26 (FIG. 5), which is rotationally integral with the shaft 20 by means of a grooved coupling 27.

The casing 24 (FIG. 5) houses at least one clutch plate 28 rotationally fixed to the hub 26 and at least one clutch plate 29 rotationally fixed to the casing.

The clutch plates 28, 29 are axially sliding, and are kept in a pack, in the normal clutch closing position, by means of a clutch pressure plate spring 30 comprising, in a known manner, an outer annular portion 31 and a plurality of elastic arms 32 extending integrally and radially towards the inside of the annular portion 31. The arms 32, pivoted to the support structure 5 in the vicinity of the annular portion 31, in a known way, are shaped and preloaded so as to exert an axial action designed to maintain the clutch plates 28, 29 in a pack against an axial wall of the casing 24 in an engagement position.

The module 1 lastly comprises an actuator 34 integrated in the support structure 5. The actuator 34 is illustrated in detail in FIG. 6, and is designed to exert an axial thrust action on the ends 33 of the arms 32, when operated, to move the annular portion 31 away from the clutch plates 28, 29 and thus open the clutch 23.

Figure 6:
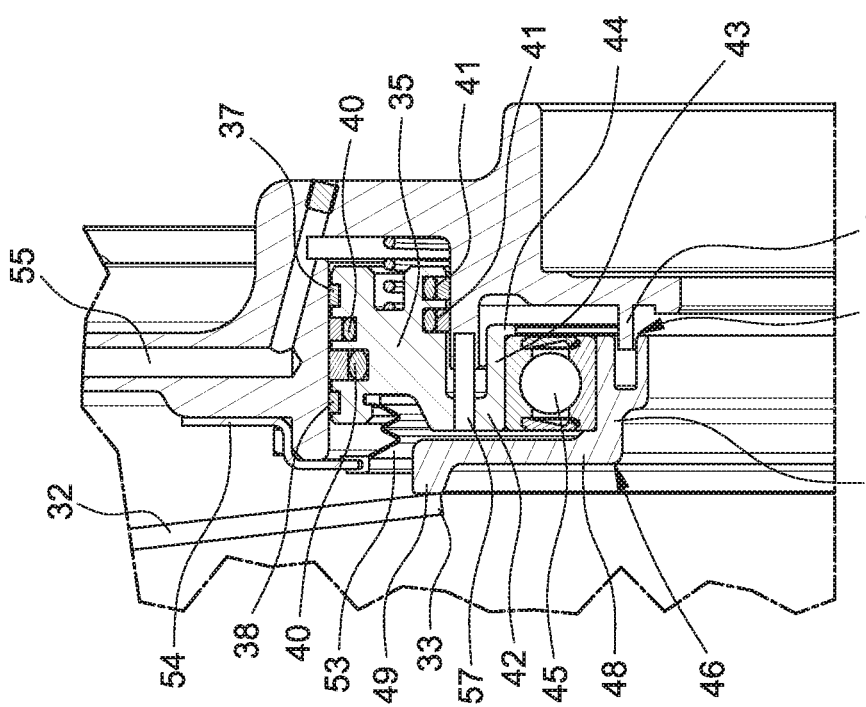
FIG. 6 is an enlarged detail of FIG. 5, with parts omitted for the sake of clarity.

With particular reference to FIG. 6, the actuator 34 comprises an annular piston 35 with axis A axially movable in an annular chamber 36 obtained in the support structure 5 in a position coaxially external to the seat 15 and open frontally towards the clutch 23.

The piston 35 is radially guided by a pair of guide rings 37, 38 housed in respective external circumferential seats of the piston 35 arranged in the vicinity of the axial ends of the piston and sliding in contact with an external circumferential surface of the annular chamber 36.

The piston 35 is further provided with a pair of external annular seals 40 arranged between the guide rings 37, 38, and a pair of internal annular seals 41 sliding in contact with an internal circumferential surface of the annular chamber 36.

At an axial end of the piston 35 facing the clutch 23, said piston 35 has an internal annular flange 42, to which a tubular portion 43 extending towards the base wall 12 of the support structure 5 integrally connects, thus defining an internal appendix of the piston 35 bent axially in a direction opposite to the clutch 23. The tubular portion 43 has an internal end shoulder 44 and houses a thrust ball bearing 45 in axial abutment against the shoulder 44.

The actuator 34 lastly comprises a thrust member 46 integrally comprising a tubular sleeve 47 housed inside the bearing 45, a substantially flat annular portion 48 radially extending outwards from an axial end of the sleeve 47 facing the clutch 23 and a thrust portion 49 defined by an outer radial edge of the annular portion 48 bent axially in a direction opposite to the piston 35, which it axially faces. The thrust portion 49 cooperates with the ends 33 of the arms 32 of the clutch pressure plate spring 30.

Expediently, the piston 35 is rotationally blocked with respect to the annular chamber 36 so as to avoid any undesired rotations causing premature wear on the seals 40, 41 and the guide rings 37, 38. This can be carried out by means of an axial pin 57 engaging respective holes of the annular flange 42 of the piston 35 and of the thrust member 46 (FIG. 6).

The sleeve 47 forms a labyrinth seal 52 with a tubular protrusion 51 extending axially in a cantilever manner from the support structure 5, so as to prevent dirt from entering the area of the inner circumferential surface of the annular chamber 36.

The actuator 34 further comprises an annular bellow-shaped element 53 secured on one side to the piston 35 and on the other to an annular flange 54 applied frontally on the support structure 5, so as to prevent dirt from entering the area of the external circumferential surface of the annular chamber 36.

In addition to supporting the bellow-shaped element 53, the flange 54 acts as a safety end stop for the piston 35, to prevent overtravel in the event of excess pressure or non-contact.

Expediently, the support structure 5 defines an internal channel 55 for the supply/discharge of oil to/from the annular chamber 36 of the actuator 34; the channel 55 (FIG. 5) establishes communication between the annular chamber 36 and a radial connection 56 arranged on the perimeter flange 13 of the support structure 5 and designed to be connected to a hydraulic control circuit.

The channel 55 is expediently defined by two or more holes obtained in the thickness of the wall 12; said holes can be provided from the outside by means of conventional drilling operations, and intersect with one another so as to define a continuous path; the openings of the holes can be plugged if necessary.

The damper 18 (FIGS. 3 and 5) comprises an annular casing 60 formed by a pair of half-shells 61, 62, on the periphery of which the crown wheel 8 of the transmission 6 is fitted. The damper 18 further comprises an actuator 63 comprising a disc 64 rigidly (and preferably integrally) connected to the shaft 20 and provided with two radial spokes 65 (only one of which can be seen in FIG. 5) housed in the annular casing 60. The latter forms a pair of diametrically opposite stops 66 defined by internal protrusions of the half-shells 61, 62.

Figure 7:
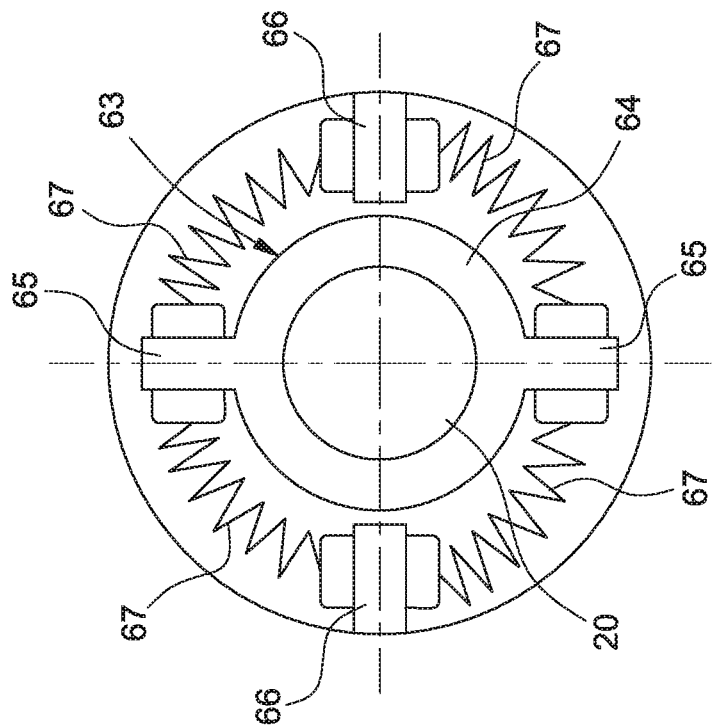
FIG. 7 is a diagram of a damper of the module of FIG. 1.

As illustrated in the diagram of FIG. 7, between the spokes 65 and the stops 66 circumferential helical springs are arranged, having the purpose of elastically coupling the actuator 63 (and therefore the shaft 20) with the annular casing 60 (and therefore with the crown wheel 8 of the transmission 6), so as to filter the torsional vibrations transmitted in use from the crankshaft 7 to the electric machine 2.

A flex plate 67 constituting the interface member between the module 1 and the transmission T is secured to the disc 64 of the actuator 63.

The operation of the transmission module 1, already partly evident from the above description, is the following.

In use, when the clutch 23 is closed, the shaft 20 is connected both to the crankshaft 7 of the internal combustion engine (E), and to the electric machine 2 by means of the damper 18 and the transmission 6, and to the vehicle transmission T by means of the flex plate 67.

In this condition, the electric machine 2 can be used both as a generator (for recharging the battery during operation of the internal combustion engine, or as a regenerative brake) and as a motor for starting the internal combustion engine or for delivering an additional torque during operation of the internal combustion engine (boosting).

When the clutch 23 is open, the electric motor can be used for electric driving, electric braking and coasting with the internal combustion engine switched off.

The use of an actuator 34 integrated in the support structure 5, compared to conventional autonomous solutions, allows the axial dimensions of the module 1 to be substantially reduced and therefore the module to be housed in situations where there is limited axial space available.

The integration of the actuator 34 in the support structure also allows dedicated fixing means to be avoided.

Lastly it is clear that modifications and variations can be made to the actuator 34 and to the module 1 comprising it that do not depart from the scope defined by the claims.

The invention claimed is:

1. A transmission module for a hybrid drive vehicle configured to be interposed between an internal combustion engine and a transmission of the vehicle, the module comprising:
   a support structure configured to be secured to the engine and defining a housing for a clutch, and
   a hydraulic actuator for controlling the clutch, wherein the hydraulic actuator includes an annular chamber provided in the support structure and open towards the housing for the clutch, an annular piston axially movable in the annular chamber, and a thrust member constrained in a rotationally free manner to the piston, coaxial thereto and configured to cooperate with a control member of the clutch under the thrust of the piston,
   wherein the annular piston is provided with seals cooperating with an internal circumferential surface and an external circumferential surface of the annular chamber and a pair of guide rings cooperating in a sliding manner with one of said circumferential surfaces of the annular chamber and arranged on axially opposite sides of the seals.

2. The transmission module as claimed in claim 1, wherein the piston is constrained to the support structure so that it cannot rotate with respect to the annular chamber.

3. A transmission module for a hybrid drive vehicle configured to be interposed between an internal combustion engine and a transmission of the vehicle, the module comprising:
   a support structure configured to be secured to the engine and defining a housing for a clutch, and a hydraulic actuator for controlling the clutch, wherein the hydraulic actuator includes an annular chamber provided in the support structure and open towards the housing for the clutch,
   an annular piston axially movable in the annular chamber, and
   a thrust member constrained in a rotationally free manner to the piston, coaxial thereto and configured to cooperate with a control member of the clutch under the thrust of the piston,
   wherein the annular piston includes an internal tubular appendix extending from an axial end of the piston facing the housing of the clutch and bent axially in a direction opposite to the clutch, wherein the transmission module further comprises a bearing radially interposed between the annular piston and the thrust member, the bearing being interposed between said appendix and a sleeve of the thrust member housed inside the piston.

4. The transmission module as claimed in claim 3, wherein the thrust member includes a thrust portion axially facing the annular piston and connected to said sleeve by a substantially flat annular portion.

5. The transmission module as claimed in claim 3, further comprising a safety end-stop member fixed to the support structure and axially facing the tubular piston to prevent overtravel thereof towards the clutch.

6. The transmission module as claimed in claim 3, wherein said actuator includes at least one seal to prevent dirt from entering the annular chamber.

7. The transmission module as claimed in claim 3, wherein the support structure is provided with internal ducts for the connection of the actuator to a hydraulic control circuit.

8. The transmission module as claimed in claim 3, further comprising a shaft configured to be connected to said clutch and a transmission housed in the support structure and including at least a first rotating member coupled to the shaft and a second rotating member rotationally coupled to the first rotating member and configured to be connected to an electric machine.

9. A transmission module for a hybrid drive vehicle configured to be interposed between an internal combustion engine and a transmission of the vehicle, the module comprising:
   a support structure configured to be secured to the engine and defining a housing for a clutch, and
   a hydraulic actuator for controlling the clutch,
   wherein the hydraulic actuator includes an annular chamber provided in the support structure and open towards the housing for the clutch, an annular piston axially movable in the annular chamber, and a thrust member constrained in a rotationally free manner to the piston, coaxial thereto and configured to cooperate with a control member of the clutch under the thrust of the piston,
   the transmission module further comprising a shaft configured to be connected to said clutch and a transmission housed in the support structure and including at least a first rotating member coupled to the shaft and a second rotating member rotationally coupled to the first rotating member and configured to be connected to an electric machine, wherein the first rotating member is coupled to the shaft by means of a torsional vibration damper.

10. The transmission module as claimed in claim 9, wherein the support structure includes a first seat through which said shaft is supported, and a second seat through which said second rotating member is supported.

11. The transmission module as claimed in claim 9, wherein said transmission is a chain or belt transmission.

* * * * *